(12) United States Patent
Choi et al.

(10) Patent No.: US 6,963,550 B2
(45) Date of Patent: Nov. 8, 2005

(54) HANDOFF METHOD IN CDMA COMMUNICATION SYSTEM

(75) Inventors: Young Su Choi, Suwon-shi (KR); Woon Suk Chang, Seoul (KR)

(73) Assignee: LG Electronics Inc., Seoul (KR)

( * ) Notice: Subject to any disclaimer, the term of this patent is extended or adjusted under 35 U.S.C. 154(b) by 850 days.

(21) Appl. No.: 09/838,553

(22) Filed: Apr. 20, 2001

(65) Prior Publication Data

US 2002/0048266 A1 Apr. 25, 2002

Related U.S. Application Data

(60) Provisional application No. 60/278,003, filed on Mar. 23, 2001.

(30) Foreign Application Priority Data

Oct. 24, 2000 (KR) .............................. P2000-62466

(51) Int. Cl.[7] .............................................. H04Q 1/10

(52) U.S. Cl. ...................................... 370/331; 455/436

(58) Field of Search ............................... 370/331, 332, 370/333, 436, 438; 455/436, 437

(56) References Cited

U.S. PATENT DOCUMENTS

| | | | |
|---|---|---|---|
| 6,253,083 B1 * | 6/2001 | Hacena et al. | 455/437 |
| 6,507,572 B1 * | 1/2003 | Kumar et al. | 370/335 |
| 6,549,787 B1 * | 4/2003 | Ravi | 455/525 |
| 6,590,879 B1 * | 7/2003 | Huang et al. | 370/331 |
| 6,633,554 B1 * | 10/2003 | Dalal | 370/331 |
| 2001/0050907 A1 * | 12/2001 | Madour et al. | 370/329 |
| 2002/0141361 A1 * | 10/2002 | Madour et al. | 370/331 |

* cited by examiner

Primary Examiner—Ricky Ngo
Assistant Examiner—Duc Duong
(74) Attorney, Agent, or Firm—Fleshner & Kim, LLP

(57) ABSTRACT

A handoff method in a CDMA system is performed when a mobile station with dormant packet data call is handed off to an area where the packet zone identifier is changed. The method includes call connection handoffing first information from first base station to second base station by a mobile station, comparing first packet zone identifier about the call of second information transmitted from the second base station with second packet zone identifier about the call of the second information maintained by the mobile base station, and transmitting a call setting message of the second information from the mobile station to the second base station to request a handoff of the second information if the identifiers are different. Therefore, an In-traffic System Parameter message is used, thereby excluding the need for additional hardware.

30 Claims, 1 Drawing Sheet

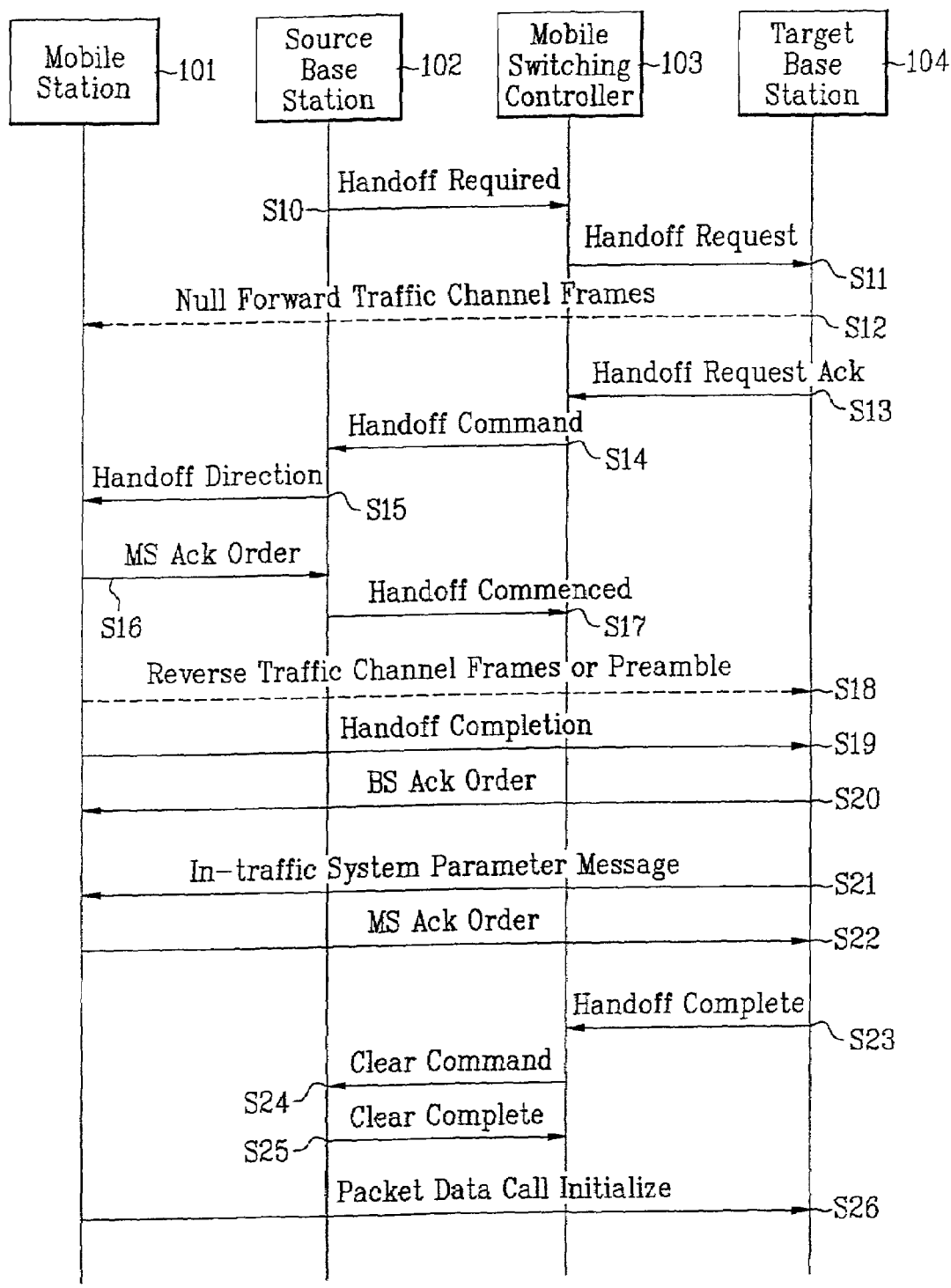

HANDOFF METHOD IN CDMA COMMUNICATION SYSTEM

Priority of Provisional Application Ser. No. 60/278,003, filed on Mar. 23, 2001 is claimed under 35 U.S.C. 119(e), the entire disclosure of which is incorporated herein by reference.

BACKGROUND OF THE INVENTION

1. Field of the Invention

The present invention relates to a CDMA communication system, and in particular, to a handoff method in a CDMA system.

2. Background of the Related Art

In communications systems having geographically fixed stations and mobile stations, it is necessary to handoff the communications with the mobile station from a first fixed station to a second fixed station, as the mobile station moves farther away from the first fixed station and closer to the second fixed station. In the cellular communications context, as a mobile station travels out of a first cell and into a second cell, communications with the mobile station must be passed from a base station in the first cell to the base station in the second cell.

There are three types of conventional handoffs, depending on the multiple access system employed in the communications system. They are the hard handoff, soft handoff, and softer handoff.

A hard handoff is characterized by a temporary disconnection of the forward and reverse channels and is typical in a FDMA or TDMA environment. As the mobile unit moves out of a currently serviced cell area during a communications session, the received signal becomes weak and a handoff is required. To perform the hard handoff, the communications system switches the communications session to a new channel while the session continues. In hard handoffs in FDMA or TDMA (or from one CDMA system to another CDMA system using a different frequency or frame offset), the receiver in the mobile unit stops demodulating and decoding information transmitted on the old channel link, from the cell initially servicing the session, and then starts demodulating and decoding information transmitted via a second channel link.

In a FDMA or TDMA cellular system, the handoff scheme implemented is intended to allow a call to continue when a mobile telephone crosses the boundary between cells. The handoff from one cell to another is initiated when the receiver in the cell base station handling the call notices that the received signal strength from the mobile station falls below a predetermined threshold value. A low signal to noise ratio indication indicates that the mobile telephone is on the cell boundary. When the signal level falls below the predetermined threshold value, the base station asks the system controller to determine whether a neighboring base station is receiving the mobile signal with better signal strength than the current base station. The system controller, in response to the current base station's inquiry, sends messages to the neighboring base stations with a handoff request. The base stations neighboring the current base station employ scanning receivers which receive the signal from the mobile station on the specified channel.

A handoff will be attempted when one of the neighboring base stations reports an adequate signal level to the system controller. This scenario is called a "base station initiated handoff process." Handoff is then initiated when an idle channel from the channel set used in the new base station is selected. A control message is sent to the mobile station commanding it to switch from the current channel to the new channel. At the same time, the system controller switches the call from the first base station to the selected base station. This process is sometimes called "break before connect." Because a hard handoff is completed by a temporary disconnection of the traffic channel, information in the received signal may be lost.

The soft handoff (as used in a CDMA environment) alleviates the problem of the temporary disconnection. In a soft handoff, two or more received signals through different cells are simultaneously demodulated, combined, and decoded by the same receiver unit. Because the CDMA environment enables the receiver to simultaneously demodulate, combine, and decode signals from more than one base station, the soft handoff does not require any disconnection of the traffic channels. A user moving into the service area of another base station does not need to change its receiving or transmitting frequency. A soft handoff is characterized by initiating communications using a new code sequence (i.e., with a new base station at a new cell) on the same CDMA frequency before terminating communications with the old code sequence.

One soft handoff system used in conjunction with a cellular communication system is described in U.S. Pat. No. 5,640,414 for the "Mobile Station Assisted Soft Handoff in a CDMA Cellular Communications Systems," issued to Blakeney II, et al. (the "414 patent"), which is incorporated herein by reference. The initiation of the handoff process is invoked by the mobile station measuring the signal power of the handoff-assisting pilot signal over the pilot channel in the CDMA system. Alternatively, it can be invoked by the base station measuring the signal power from the mobile station. A typical CDMA soft handoff is implemented by diversity combining (i.e., combining signals from either the same or different base stations) in conjunction with a RAKE receiver, thereby providing better call reliability than a hard handoff. Additionally, the handoff process between cells is completed in a manner that is transparent to the user.

As described in the 414 patent with reference to a cellular communications system, the mobile initiated handoff method is different from the base station initiated handoff method. The mobile initiated handoff relies on the mobile station to detect the presence or absence of pilot signals and the signal strength of the pilot signals. Thus, in order to perform a handoff initiated by a mobile station, the mobile station is equipped with a search receiver to scan pilot signals from other base stations. One reason to employ a mobile initiated handoff method is that the mobile station is more sensitive than base stations to changes in path between itself and various neighboring base stations.

In a related art CDMA system, two types of handoff operations are typically implemented. They are the soft handoff and the CDMA-to-CDMA hard handoff. The CDMA-to-CDMA hard handoff is similar to that of the TDMA or FDMA system, and call interruption may occur. Each of these methods is described in more detail below.

In the soft handoff situation, the mobile station typically initiates the handoff process. The mobile station performs signal diversity combining to and/or from multiple base stations. The mobile station employs RAKE receivers to receive communications simultaneously from the multiple base stations. A soft handoff occurs when the mobile station is communicating simultaneously with two or more base stations, or with two or more sectors of the same base station (softer handoff) before communications with the previous base station or sector is dropped. The softer handoff is a special type of soft handoff, and no distinction is made herein between a soft and a softer handoff. In the soft handoff environment, the call between a mobile station and an end user is not interrupted by the eventual handoff from the base station corresponding to the cell from which the mobile station currently is being serviced to the base station corresponding to the cell from which the mobile station is to receive services.

Generally in a handoff, a mobile station currently in communication continuously probes the intensity of pilot signals from the currently connected source base station and from neighboring base stations or sectors. It then compares the intensity of the pilot signals from the probed base stations with the intensity of the pilot signal of the current source base station, and reports to the source base station for a handoff to one of the neighboring base stations when the intensity of the pilot signal from the neighboring base station exceeds a predetermined value. The source base station orders the mobile station to perform a handoff when prepared to perform handoff to the corresponding base station or sector. Therefore, the mobile station can continuously communicate while obtaining a new communication channel.

In the CDMA Cellular/Personal Communication Service (PCS) telephone system, a mobile station uses a soft handoff that supports a new communication channel while maintaining the previous communication channel when performing a handoff between base stations or sectors having the same frequency, frame offset, and exchanger. However, the mobile station uses a hard handoff when it moves to a base station that belongs to a different switching center, changes the traffic channel into another frequency channel, or switches into another traffic channel having a different frame offset.

In turn, the third generation partnership project 2 (3GPP2) supports a new handoff different from the foregoing handoff since a concurrent multiple service is supposed to support a voice data service together with a packet data service.

In particular, when a mobile station in which voice data is being served and a packet data service is in a dormant state performs a hard handoff into an area where a packet zone identifier (PZ_ID) is changed, the mobile station can not monitor a paging channel in a traffic channel occupying state. Therefore, the mobile station cannot recognize the PZ_ID change, and thus fails to initiate a dormant handoff. This can present a problem. For example, when the packet data service is resumed after completion of the hard handoff, a packet control function (PCF) and a packet data serving node (PDSN) will attempt service to the source base station instead of the target base station where the mobile station is actually located. Consequently, the packet data service cannot be provided to the corresponding mobile station.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide a method for performing a handoff in a mobile communication system that substantially obviates problems caused by disadvantages in the related art.

It is another object of the present invention to provide a method for performing a handoff in a mobile communication system that updates information for a dormant packet data service when the handoff occurs.

It is another object of the invention to provide a handoff method in a CDMA communication system in which an information message about a PZ_ID subjected to change is transmitted over a traffic channel to a mobile station where a voice call is activated so that a packet data service can be provided after a handoff to an area of different PZ_ID.

In order to achieve at least the above objects, in whole or in parts, there is provided a method of handoff in a CDMA communication system comprising executing handoff of the call connection of a first information call of a mobile station from a first fixed station to a second fixed station; comparing the packet zone identifier of a second information call transmitted from said second fixed station with the packet zone identifier maintained by said mobile station; and transmitting a call initializing message of the second information call from the mobile station to the second fixed station to request a handoff of the second information call if the identifiers are different.

It is preferred that the second information is packet data and the call thereof is dormant, and the first information is voice call. Additionally, in the execution of the handoff of the call connection of a first information call, the handoff can be a hard handoff. It is further preferred that the packet zone identifier is transmitted to the mobile station over an in-traffic system parameter message from the second fixed base station. Accordingly, a handoff is successfully performed when a mobile station with active voice call and dormant data call moves to an area where the packet zone identifier (PZ_ID) is different from that of the previous area.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1 shows a flow of a packet dormant hard handoff according to the preferred embodiment of the invention.

DETAILED DESCRIPTION OF PREFERRED EMBODIMENTS

Referring to FIG. 1, a mobile communication system of the preferred embodiment comprises a mobile station 101 capable of supporting concurrent service, a source base station 102 for carrying out call control before a handoff, a target base station 104 for carrying out call control after handoff, and a mobile switching center (MSC) 103 for carrying out the overall call control and switch control.

The mobile communication system is preferably operated in association with a packet control function (PCF) (not shown) and a packet data serving node (PDSN) (not shown) to support a packet data service of the concurrent multiple service. The PCF, which has a unique PZ_ID, interfaces with the PDSN and the MSC 103. The PDSN is associated with the Internet network to transfer packet data from the Internet to the mobile station 101 over the PCF.

The invention is primarily related to a procedure in which the mobile station performs a hard handoff, while a voice call is active and a packet data service call is dormant. Hence, the description will be limited to the initial procedure of a packet dormant handoff. Other related procedures detracting from the focus of the invention, such as call setting and release, will not be described. For purposes of example, a dormant state of the packet data service is assumed to use a point-to-point protocol (PPP) that is set between the mobile station 101 and the PDSN (not shown).

Referring to FIG. 1, the source base station 102 first determines the necessity of a handoff to the target base station 102. The source base station 104 transmits a Handoff Required message to the mobile switching center 103 on the basis of a report or a transmission of a pilot strength measurement message (PSMM) from the mobile station 101, indicating that the intensity of the pilot signal from the target station 104 satisfies handoff conditions (S10). That is, it indicates that T_ADD is larger than a critical value. Here, a number of the target base station 102 has a limited range of one or more according to support from the system.

The MSC 103, upon receiving the Handoff Required message, transmits a Handoff Request message (S11). The Handoff Request message preferably includes notice that the handoff type is a hard handoff. This message is sent to the target base station 104, thereby requesting allocation of radio source of the target base station 104.

The target base station 104, upon receiving the Handoff Request from the mobile switching center 103, allocates a radio source desired for the hard handoff, and transmits a Null Forward Traffic Channel Frame to the mobile station 101 (S12). The target base station 104 also transmits a Handoff Request Ack (acknowledgment) message to the mobile switching center 103 to report the allocation completion of the radio source for the hard handoff (S13). The transmitted Handoff Request Ack message preferably includes channel information about the allocated radio source so that the mobile station 101 can be connected to the newly allocated radio source channel.

The mobile switching terminal, upon receiving the Handoff Request Ack message, prepares to switch the call from the source base station 102 to the target base station 104, and transmits a Handoff Command message from the mobile switching center 103 to the source base station 102 (S14). The transmitted Handoff Command message preferably includes channel information about the radio source received from the target base station 104.

The source base station 102, upon receiving the Handoff Command message, transmits a Handoff Direction message to the mobile station 101 to direct the handoff (S15). The mobile station 101 transmits a MS (mobile station) Ack Order message to the source base station 102 in response to receipt of the Handoff Direction message (S16). The source base station 102, upon receiving the MS Ack Order message, transmits a Handoff Commenced message to the mobile switching center 103 to acknowledge a hard handoff of the mobile station 101 to the target base station 104 (S17).

In turn, the mobile station 101, after transmitting the MS Ack Order message, transmits a Reverse Traffic Channel Frame or a Preamble to the target base station 104 (S18). The mobile station 101 also transmits a Handoff Completion message to the target base station 104 simultaneously with the Reverse Traffic Channel Frame (S19).

The target base station 104, upon receiving the Handoff Completion message, transmits a BS (base station) Ack Order message to the mobile station 101 (S20). The target base station 104 also transmits an In-traffic System Parameter message, including the PZ_ID of the target base station 104, to the mobile station 101 to support the packet dormant handoff of the mobile station, which is on the concurrent service (S21). The In-traffic System Parameter message preferably includes information to be transmitted from the target base station 104 to the mobile station 101.

The mobile station 101 transmits an MS Ack Order message to the target base station 104 in response to the receipt of the In-traffic System Parameter message (S22). The target base station 104, upon receiving the MS Ack Order message, transmits a Handoff Complete message to the mobile switching center 103 to acknowledge a successful hard handoff completion of the mobile station 101 (S23). The mobile switching center 103 transmits a Clear Command message to the source base station 102 to release the call source of the source base station 102 (S24). The source base station 102 then transmits a Clear Complete message to the mobile switching center 103 to report the completion of the call source release (S25).

After the source release of the source base station 102, the mobile station 101 determines whether the PZ_ID received via the In-traffic System Parameter message is identical as that of the mobile station 101. If the PZ_IDs are different, the mobile station 101 determines that the packet dormant handoff should be performed, and transmits a Packet Data Call Initialize message to the target base station 104 to request the packet dormant handoff (S26). Finally, the target base station 104, upon receiving the request for the packet dormant handoff, completes the packet dormant handoff through a predetermined procedure with the PCF (not shown) associated therewith for performing the packet dormant handoff.

As described herein, according to the preferred embodiment, a packet dormant handoff can be performed when a hard handoff takes place on a concurrent service call in which a voice service call is activated and a packet service call is dormant. Therefore, the preferred embodiment uses an In-traffic System Parameter message, which is used in the related art, to transmit PZ_ID information that is changed upon performing the foregoing packet dormant handoff to a mobile station. By doing this, additional hardware is not needed.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of handoff in a CDMA communication system, comprising:

executing a handoff of a call connection of an active voice call of a mobile station from a first base station to a second base station;

comparing a packet zone identifier of a second information packet data call transmitted from the second base station with a packet zone identifier of a dormant packet data call that is concurrent with the active voice call and maintained by the mobile station, said packet zone identifiers uniquely identifying a packet control function coverage area; and transmitting a packet data call initializing message from the mobile station to the second base station to request a handoff of the dormant packet data call if the packet zone identifiers are different.

2. The method of claim 1, wherein an information transmission connection with the second base station is initialized after the mobile station completes an information transmission connection with the first base station in said handoff execution step from the first base station to the second base station.

3. The method of claim 1, wherein the packet zone identifier is transmitted from the second base station to the mobile station via a message in the information transmitted from the second base station.

4. The method of claim 5, wherein the message in the transmitted information is an in-traffic system parameter message.

5. A method of performing a handoff in a communication system, comprising:
performing a handoff of an active call of a subscriber unit from a first base station to a second base station;
receiving an In-traffic System Parameter Message having a packet zone identifier uniquely identifying a packet control function coverage area from the second base station over an air interface; and
comparing the packet zone identifier of the second base station transmitted in the In-traffic System Parameter Message with a packet zone identifier of the first base station stored in the subscriber unit to perform a handoff of a concurrent dormant packet data call, if the packet zone identifiers are different from each other.

6. The method of claim 5, further comprising transmitting an acknowledge order from the subscriber unit to the second fifed base station to acknowledge receipt of the In-traffic System Parameter Message.

7. The method of claim 6, further comprising transmitting a Handoff Complete message from the second base station to a switching center associated with the first and second base stations to indicate that the handoff is complete.

8. The method of claim 5, wherein an information transmission connection with the second base station is initialized after the subscriber unit releases an information transmission connection with the first base station after the handoff of the concurrent dormant packet data call from the first base station to the second base station.

9. The method of claim 5, wherein the handoff of the concurrent packet data call is completed using the Packet Control Function.

10. The method of claim 5, wherein the concurrent packet data call uses a Point-to-Point (PPP) to communicate with a Packet Data Service Node.

11. The method of claim 5, wherein performing the handoff of the active call comprises:
transmitting a handoff required message from the first base station to a mobile switching center th determine if a handoff is necessary;
transmitting a Handoff Request message from the mobile switching center to the second base station to request a handoff to the second base station if a handoff is necessary;
transmitting Null Forward Traffic frames from the second base station to the subscriber unit to assist in acquiring the subscriber unit by the second base station;
transmitting a Handoff Request Acknowledge message from the second base station to the mobile switching center to acknowledge receipt of the Handoff Request message;
transmitting a Handoff Command message from the mobile switching center to the first base station to initiate the handoff;
transmitting a Handoff Direction message from the first base station to the subscriber unit to inform the subscriber unit of the handoff;
transmitting an Acknowledge Order message from the subscriber unit to the first base station to acknowledge receipt of the Handoff Direction message;
transmitting a Handoff Commenced message from the first base station to the mobile switching center to indicate that the handoff has commenced;
transmitting at least one of Reverse Traffic Channel Frames and a Preamble from the subscriber unit to the second fifed base station;
transmitting a Handoff Completion message from the subscriber unit to the second base station to indicate that the handoff has been completed; and transmitting an Acknowledge Order message from the second base station to the subscriber unit to acknowledge receipt of the Handoff Completion message.

12. The method of claim 11, further comprising:
transmitting an Acknowledge Order message from the subscriber unit to the second base station after receiving the In-traffic System Parameter Message to acknowledge receipt of the In-traffic System Parameter Message;
transmitting a Handoff Complete message from the second base station to the mobile switching center to indicate that the handoff is complete;
transmitting a Clear Command message from the mobile switching center to the first base station to inform the first base station that the subscriber unit may be cleared from the first base station; and
transmitting a Clear Complete message from the first base station to the mobile switching center to indicate that the subscriber unit has been cleared from the first base station.

13. The method of claim 5, wherein the communication system is a CDMA communication system.

14. The method of claim 5, further comprising transmitting a call initializing message of the packet data call from the subscriber unit to the second base station to request a dormant handoff of the packet data call if the packet zone identifiers of the first and second base stations are different.

15. A method of performing a handoff in a mobile communication system, comprising:
performing an active voice call and a concurrent dormant packet data call with a first base station;
performing a handoff of the active voice call from the first base station to a second base station;
receiving a packet zone identifier identifying a specific packet control function coverage area from the second base station;
transmitting a packet data call initialize message to the second base station if the packet zone identifier of the second base station is different than a packet zone identifier of the first base station; and
completing a dormant handoff using a Packet Control Function of the concurrent dormant packet data call when the packet zone identifiers are different from each other.

16. The method of claim 15, wherein the packet zone identifier is received from the second base station in an In-Traffic System Parameter message.

17. The method of claim 16, wherein a single subscriber unit maintains at least two calls on a single logical connection between a call controller and a switching center when the handoff is performed.

18. The method of claim 15, wherein the packet zone identifier of the first base station is stored in a subscriber unit to compare it to the packet zone identifier of the second base station.

19. A method of performing a dormant handoff, comprising:
    performing a handoff of an active call from a first base station to a second base station;
    receiving an In-traffic System parameter message from the second base station, said In-traffic System parameter message including a packet zone identifier designating a zone coverage area for a packet control function processing packet data of the second base station; and
    performing a dormant handoff of a dormant packet call that is concurrently maintained with the active call based on information in the In-traffic System parameter message.

20. A user equipment for a communication system, comprising:
    means for maintaining two concurrent calls on a single logical connection;
    means for performing a handoff of an active one of the two concurrent calls from a first base station to a second base station;
    means for storing a packet zone identifier uniquely identifying a packet control function coverage area of the first base station;
    means for receiving an In-traffic System Parameter Message having a packet zone identifier uniquely identifying a packet control function coverage area of the second base station from the second base station over an air interface;
    means for comparing the packet zone identifier of the second base station to the packet zone identifier of the first base station; and
    means for performing a dormant handoff of a dormant one of the two concurrent calls, wherein the dormant call is a dormant packet data call.

21. The user equipment of claim 20, further comprising means for transmitting an acknowledge order to the second base station to acknowledge receipt of the In-traffic System Parameter Message.

22. The method of claim 1, wherein comparing the packet zone identifiers is performed by the mobile station.

23. The method of claim 5, wherein comparing the packet zone identifiers is performed by the subscriber unit.

24. The method of claim 15, wherein a subscriber unit in the handoff compares the packet zone identifiers of the first and second base stations to determine if the packet zone identifiers are different.

25. The method of claim 21, wherein performing the dormant handoff comprises:
    comparing, by a mobile terminal in the handoff, the received packet zone identifier of the second base station with a packet zone identifier corresponding to the base station; and
    performing the dormant handoff when the packet zone identifiers are different from each other.

26. The user equipment of claim 20, wherein the means for comparing is performed by a user equipment in the handoff.

27. A method of performing handoff in a communication system comprising:
    receiving a message for a handoff of an active call by a subscriber unit;
    receiving an In-traffic System Parameter Message having an indicator uniquely identifying a current packet zone;
    detecting a change in a packet zone based on the received In-traffic System Parameter Message using the indicator in the received In-traffic System Parameter Message and an indicator of a dormant packet data session concurrent with the active call; and
    establishing a packet data service.

28. The method of claim 27, further comprising performing a handoff of the concurrent dormant packet data call if the indicators are different from each other.

29. The method of claim 27, further comprising transmitting an acknowledge order from the subscribe unit to a target base station that transmitted the In-traffic System Parameter Message to acknowledge receipt of the In-traffic System Parameter Message.

30. The method of claim 29, further comprising transmitting a Handoff Complete message from the target base station to a switching center associated with the base stations performing the handoff to indicate that the handoff is complete.

* * * * *